US012653034B2

(12) United States Patent
Das et al.

(10) Patent No.: US 12,653,034 B2
(45) Date of Patent: Jun. 9, 2026

(54) INTEGRATED CIRCUIT DEVICES WITH CAPACITORS FOR TAMPER DETECTION

(71) Applicant: TEXAS INSTRUMENTS INCORPORATED, Dallas, TX (US)

(72) Inventors: Abhijit Kumar Das, Plano, TX (US); Suman Bellary, San Jose, CA (US); Clive Bittlestone, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 399 days.

(21) Appl. No.: 16/552,551

(22) Filed: Aug. 27, 2019

(65) Prior Publication Data

US 2021/0066214 A1 Mar. 4, 2021

(51) Int. Cl.
| | |
|---|---|
| *H01L 23/00* | (2006.01) |
| *G06F 21/72* | (2013.01) |
| *H01L 23/522* | (2006.01) |

(52) U.S. Cl.
CPC ............ H01L 23/573 (2013.01); G06F 21/72 (2013.01); H01L 23/5223 (2013.01); H01L 23/5225 (2013.01)

(58) Field of Classification Search
CPC .............. H01L 23/573; H01L 23/5223; H01L 23/5225; G06F 21/72
USPC ........................................................ 713/194
See application file for complete search history.

(56) References Cited

U.S. PATENT DOCUMENTS

| | | | | |
|---|---|---|---|---|
| 5,583,359 A | * | 12/1996 | Ng | ...................... H01L 23/5223 |
| | | | | 257/532 |
| 5,668,551 A | * | 9/1997 | Garavan | ............. H03M 1/1009 |
| | | | | 341/172 |

| | | | | |
|---|---|---|---|---|
| 6,191,666 B1 | * | 2/2001 | Sheen | .................. H03H 7/1758 |
| | | | | 333/204 |
| 6,233,339 B1 | | 5/2001 | Kawano | |
| 6,980,414 B1 | * | 12/2005 | Sutardja | .............. H01L 27/0805 |
| | | | | 361/321.1 |

(Continued)

FOREIGN PATENT DOCUMENTS

| | | | |
|---|---|---|---|
| CN | 104425441 | * | 3/2015 |
| CN | 103093143 B | | 7/2017 |

(Continued)

OTHER PUBLICATIONS

International Search Report for PCT/US2020/047920 mailed Nov. 5, 2020.

(Continued)

*Primary Examiner* — Sheng-Bai Zhu

(74) *Attorney, Agent, or Firm* — Michael T. Gabrik; Frank D. Cimino

(57) ABSTRACT

An integrated circuit device is provided. In some examples, an integrated circuit die of the device includes a first capacitor arranged such that when the integrated circuit die is coupled to a package, the package affects a capacitance of the first capacitor, a second capacitor disposed directly underneath the first capacitor, and a capacitance measurement circuit coupled to the first capacitor and the second capacitor to determine the capacitance of the first capacitor and a capacitance of the second capacitor. The integrated circuit device may detect tampering with the die and/or the package based on the capacitances of the first capacitor and the second capacitor.

17 Claims, 6 Drawing Sheets

(56)        References Cited

U.S. PATENT DOCUMENTS

| | | | | |
|---|---|---|---|---|
| 7,023,301 | B2 * | 4/2006 | Kawahara | H01P 1/20345 |
| | | | | 333/204 |
| 9,331,026 | B1 * | 5/2016 | Watt | H01L 23/564 |
| 10,048,789 | B2 | 8/2018 | Filiz et al. | |
| 2002/0126424 | A1 * | 9/2002 | Tabat | G11B 5/4806 |
| | | | | 360/323 |
| 2002/0180561 | A1 * | 12/2002 | Kawahara | H01P 1/20345 |
| | | | | 333/175 |
| 2005/0054122 | A1 | 3/2005 | Celii et al. | |
| 2005/0088186 | A1 * | 4/2005 | Maciejewski | G01R 31/2831 |
| | | | | 324/671 |
| 2006/0061935 | A1 * | 3/2006 | Schultz | H01L 23/5223 |
| | | | | 361/306.1 |
| 2006/0198057 | A1 * | 9/2006 | Leung | B82Y 25/00 |
| | | | | 360/323 |
| 2006/0237819 | A1 * | 10/2006 | Kikuta | H01L 23/5223 |
| | | | | 257/532 |
| 2006/0250142 | A1 * | 11/2006 | Abe | H03K 17/955 |
| | | | | 324/663 |
| 2010/0090714 | A1 * | 4/2010 | Van Geloven | H01L 23/576 |
| | | | | 324/705 |
| 2011/0001549 | A1 * | 1/2011 | Van Gastel | H03K 17/962 |
| | | | | 327/517 |
| 2013/0104252 | A1 * | 4/2013 | Yanamadala | G06F 21/76 |
| | | | | 726/34 |
| 2014/0320151 | A1 * | 10/2014 | Filippi | H01L 23/576 |
| | | | | 324/679 |
| 2014/0333327 | A1 * | 11/2014 | Baruch | G01R 31/2834 |
| | | | | 324/658 |
| 2017/0023818 | A1 | 1/2017 | Hu et al. | |
| 2017/0058565 | A1 | 3/2017 | Sanchez | |
| 2017/0154951 | A1 * | 6/2017 | Cui | H01L 23/5225 |
| 2019/0028284 | A1 * | 1/2019 | Rezayee | H04L 9/14 |
| 2020/0349295 | A1 | 11/2020 | Yanamadala | |

FOREIGN PATENT DOCUMENTS

| | | | |
|---|---|---|---|
| CN | 113574570 | B | 8/2023 |
| JP | H06268407 | * | 9/1994 |
| JP | 2004007739 | * | 1/2004 |
| JP | 20154058 | * | 8/2015 |

OTHER PUBLICATIONS

Office Action in corresponding China Application No. 202080059920.4, issued Aug. 18, 2025.

* cited by examiner

INTEGRATED CIRCUIT DEVICES WITH CAPACITORS FOR TAMPER DETECTION

BACKGROUND

An integrated circuit may include any number of electrically interconnected active circuit elements (e.g., bipolar junction transistors, field effect transistors, etc.) and/or passive circuit element (e.g., resistors, capacitors, inductors, diodes, transformers, etc.). These circuit elements may be fabricated on a semiconductor substrate and connected by a multi-layer electrical interconnect structure disposed on the substrate. The semiconductor substrate that contains the circuit elements and the multi-layer electrical interconnect may be assembled into a die or chip.

The die itself is often small and fragile. Therefore, one or more dies may be incorporated into an integrated circuit package. The package surrounds and protects the incorporated die(s). For this purpose, the package may include layers of rigid insulating material. The package may also include layers of conductive material that extend through the insulating material to form a package-level interconnect structure. The package-level interconnect may electrically couple the dies to each other and to a remainder of a computing system. In particular, the package-level interconnect may include a number of connectors, such as ball grid array connectors, that couple to a socket to provide power and data signals to and from the die.

SUMMARY

In some examples, an integrated circuit die and package are provided. The die includes one or more sets of tamper-sensing capacitors. The tamper-sensing capacitors may be configured to detect impermissible modifications to the die and/or the package. In some such examples, a set of tamper-sensing capacitors includes a first capacitor formed in the die interconnect near the package and a second capacitor formed directly underneath first capacitor. The first capacitor is configured such that the capacitance changes when the package is tampered with, for example, by removing some or all of the package. The second capacitor near the first capacitor may be used as a reference to detect the change of the first capacitor, and in some examples, a tamper determination is made based on a comparison of the capacitance of the first capacitor to that of the second capacitor.

In some examples, an integrated circuit die includes a first capacitor such that when the integrated circuit die is coupled to a package, the package affects a capacitance of the first capacitor. The integrated circuit die further includes a second capacitor disposed directly underneath the first capacitor and includes a capacitance measurement circuit coupled to the first capacitor and the second capacitor to determine the capacitance of the first capacitor and a capacitance of the second capacitor. In some such examples, the integrated circuit die includes a multilayer interconnect. The first capacitor includes a first capacitor plate in a first layer of the multilayer interconnect and a second capacitor plate in the first layer of the multilayer interconnect that surrounds the first capacitor plate. In some such examples, the integrated circuit die further includes a set of conductive shield features disposed between the first capacitor and the second capacitor in a second layer of the multilayer interconnect. In some such examples, the second capacitor includes a first capacitor plate that includes conductive features in a second layer of the multilayer interconnect and a second capacitor plate that includes conductive features in the second layer that surround the conductive features of the first capacitor plate. In some such examples, the first capacitor plate of the second capacitor further includes conductive features in a third layer of the multilayer interconnect, and the second capacitor plate of the second capacitor further includes conductive features in the third layer. In some such examples, the integrated circuit die further includes a substrate disposed below the second capacitor and a set of conductive shield features disposed between the second capacitor and the substrate. In some such examples, the capacitance measurement circuit is configured to provide a ratio of the capacitance of the first capacitor to the capacitance of the second capacitor. In some such examples, the integrated circuit die further includes an encryption control circuit coupled to the capacitance measurement circuit to receive the ratio of the capacitance of the first capacitor to the capacitance of the second capacitor. In some such examples, the encryption control circuit detects tampering based on the ratio of the capacitance of the first capacitor to the capacitance of the second capacitor. In some such examples, the encryption control circuit is configured to attempt to decrypt an encryption key based on the ratio. In some such examples, the encryption control circuit is configured to delete an encryption key based on the ratio.

In further examples, an integrated circuit includes a die that includes: a first capacitor, a second capacitor disposed proximate to the first capacitor, a capacitance measurement circuit coupled to the first capacitor and the second capacitor to determine a capacitance of the first capacitor and a capacitance of the second capacitor, and a circuit to determine tampering of the integrated circuit based on the capacitance of the first capacitor and the capacitance of the second capacitor.

In yet further examples, a computing system includes a processing resource and a non-transitory computer-readable medium coupled to the processing resource. The non-transitory computer-readable medium stores instructions that, when executed by the processing resource, cause the processing resource to: receive a capacitance of a first capacitor of a die, receive a capacitance of a second capacitor of the die, and detect tampering based on a ratio of the capacitance of the first capacitor to the capacitance of the second capacitor

BRIEF DESCRIPTION OF THE DRAWINGS

Features of the present invention may be understood from the following detailed description and the accompanying drawings. In that regard.

DETAILED DESCRIPTION

Figure 1:
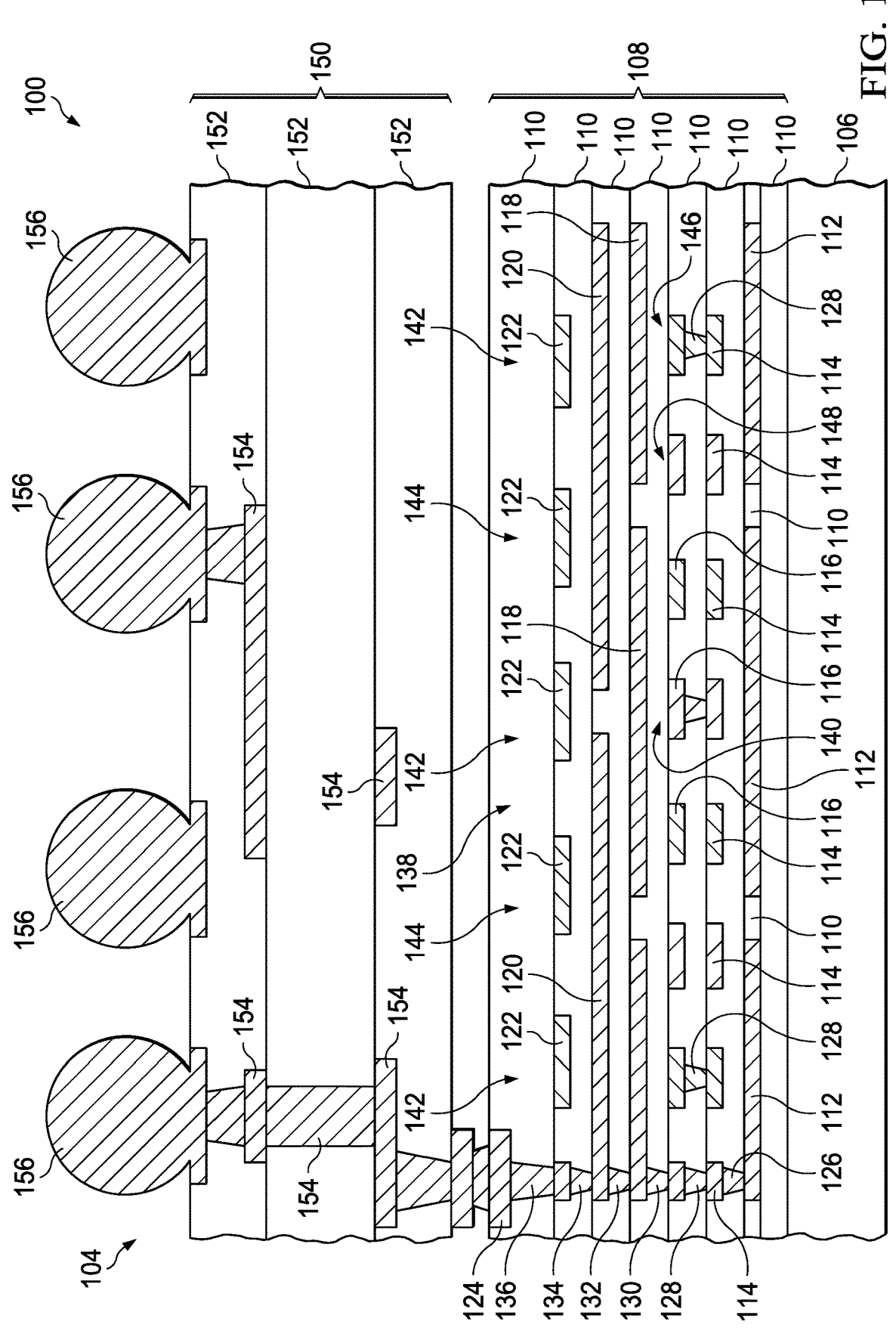
FIG. 1 is a cross sectional view of a portion of an integrated circuit device according to some aspects of the present disclosure.

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

In accordance with convention in the art, relative terms that describe orientation, such as "above," "below," "over," "under," "on," etc., are provided for clarity of discussion and are not absolute relationships. For example, a first element that is "above" a second element may be just as accurately described as "below" the second element if the orientation of the device is flipped.

The present disclosure provides a die with one or more sets of capacitors for detecting whether the die or its package has been tampered with. In some examples, the die includes a first capacitor near a part of the die that is at risk of tampering, such as the substrate or package. The first capacitor may be structured so that the electric field of the capacitor is governed by the package or substrate only and is protected from other electric fields in the surrounding area. If the die is depackaged or otherwise tampered with, the capacitance of the first capacitor is affected, and the change in capacitance may be used to detect the intrusion.

Because the capacitance of the first capacitor may be sensitive to other environmental factors, the die may include a second capacitor proximate to the first for use as a reference. The second capacitor may share the same environment but be relatively unaffected by changes to the package or substrate. In many examples, the ratio between the capacitances of the first capacitor and the second capacitor (which includes the capacitance of the first capacitor divided by the capacitance of the second capacitor and vice-versa) remains stable across changes in temperature and voltage while still producing a detectable change in the event of tampering. This provides a reliable and cost effective mechanism for detecting tampering that works with a wide array of die and package materials. In many examples, due to the small size and negligible cost of each capacitor set, the die may include multiple sets of capacitors spread across the die, providing even greater sensitivity.

While the capacitance ratio of a capacitor set may be fixed for a given die, it may vary significantly across dies. Accordingly, in some examples, the capacitance ratio is used as a chip identifier and for encryption. A key or other secure data is encrypted based on the capacitance ratio. This protects the secure data from a depackaging attack because the attack changes the capacitance ratio, rendering the system unable to decrypt the secure data once the original capacitance ratio is lost.

Examples of the integrated circuit device are described with reference to the figures below. In that regard, FIG. 1 is a cross sectional view of a portion of an integrated circuit device 100 according to some aspects of the present disclosure. The integrated circuit device 100 includes an integrated circuit die 102 coupled to an integrated circuit package 104.

The integrated circuit die 102 includes a substrate 106 upon which integrated circuit elements (e.g., transistors, diodes) are formed. In various examples, the substrate 106 includes one or more layers of elemental semiconductor material (e.g., bulk silicon, bulk germanium), compound semiconductor material (e.g., silicon germanium, silicon carbide, gallium arsenide, gallium phosphide, indium phosphide, indium arsenide, indium antimonide), and/or dielectric material (e.g., semiconductor oxide, semiconductor nitride, semiconductor oxynitride, semiconductor carbide). To form the integrated circuit elements, regions of the substrate 106 may be doped with n-type dopants, such as phosphorus or arsenic, or p-type dopants, such as boron or $BF_2$.

A die-level interconnect structure 108 is disposed on the substrate 106 and includes inter-level dielectric (ILD) layers 110 and conductive features extending through the ILD layers 110. Each ILD layer 110 may include a suitable dielectric material (e.g., semiconductor oxide, semiconductor nitride, semiconductor oxynitride, semiconductor carbide). Dielectric materials may be characterized by their dielectric constants relative to silicon oxide, and in some examples, the ILD layers 110 include low-k dielectric materials, such as Hydrogen SilsesQuioxane (HSQ), silicon oxyfluoride, silicon oxycarbide, and fluorinated amorphous carbon.

Conductive features extend throughout the ILD layers 110 to carry signals and power between the integrated circuit elements of the die 102. The features may be divided among conductor layers 112-124 that extend primarily horizontally and conductor layers 126-136 that extend primarily vertically. For ease of reference, horizontal conductor layers are referred to as M1 layer 112, M2 layer 114, M3 layer 116, M4 layer 118, M5 layer 120, M6 layer 122, and M7 layer 124; and vertical conductor layers are referred to as V1 layer 126, V2 layer 128, V3 layer 130, V4 layer 132, V5 layer 134, and V6 layer 136. The conductive features within the layers 112-136 may include any suitable conductive material, such as copper, aluminum, gold, silver, nickel, tungsten, and/or alloys thereof.

In addition to carrying signals and power, the conductive features of the interconnect 108 may be used to form other structures. In some examples, these include a first capacitor 138 disposed in one of the upper ILD layers 110 proximate to the package 104 and a second capacitor 140 disposed directly underneath the first capacitor 138. The first and second capacitors 138 and 140 may have any suitable shape and structure. Accordingly, in some examples, the first capacitor 138 includes a first set of plates 142 (indicated by a first shading pattern) and a second set of plates 144 (indicated by a second shading pattern) disposed horizontally between and alongside the first set of plates 142. The first and second sets of plates 142 and 144 may be formed from features in one of the uppermost conductor layers (e.g., M6 layer 122, M7 layer 124), and the features that form the first set of plates 142 may be electrically coupled to each other by features in the same conductor layer that lie outside of the cross-sectional plane. Similarly, the features that form the second set of plates 144 may be electrically coupled to each other by features in the same conductor layer that lie outside of the cross-sectional plane.

Furthermore, the capacitors 138 and 140 may be formed from features on more than one conductor layer. For example, the second capacitor 140 may include features in the M2 layer 114 and M3 layer 116 that form a first set of plates 146 (indicated by the first shading pattern) and a second set of plates 148 (indicated by the second shading pattern). The features that form the first set of plates 146 in the M2 layer 114 may be electrically coupled to the features that form the first set of plates 146 in the M3 layer 116 by features in the V2 layer 128, and the features that form the second set of plates 148 in the M2 layer 114 may be electrically coupled to the features that form the second set of plates 148 in the M3 layer 116 by features in the V2 layer 128.

Other conductive features may be used to control the electric field of the first and second capacitors 138 and 140. In some examples, the interconnect 108 includes conductive features that form isolating shields in the M1 layer 112 to decouple the second capacitor 140 from the substrate 106 and features that form isolating shields in the M4 layer 118 and/or M5 layer 120 to decouple the first capacitor 138 from the second capacitor 140. To the extent that the isolating shields include slots or other recesses, slots in adjacent conductor layers may be offset for better shielding. The isolating shields may be coupled to ground or a constant voltage source.

In this configuration, the first capacitor 138 is shielded below by features on the M4 layer 118 and M5 layer 120, and the shape and strength of top of the capacitor's electric field is governed by the package 104. As long as package 104 is not tampered with, the first capacitor 138 may provide a relatively constant capacitance except for fluctuations caused by environmental factors such as fluctuations in temperature or voltage. Similarly, the second capacitor 140 is shielded above and below and may therefore provide a relatively constant capacitance except for the fluctuations caused by the environmental factors.

In this way, the second capacitor 140 may be used to correct for these fluctuations in the first capacitor 138. In some examples, the capacitance ratio of the first capacitor 138 to the second capacitor 140 proves relatively stable over a wide range of temperatures and outside influences. Thus, this ratio provides a mechanism to account for the environmental factors. Should the package 104 be tampered with as part of a depackaging process or other attack, the ratio of the capacitance of the first capacitor 138 to the capacitance of the second capacitor 140 will change. In examples that follow, this change will be used to detect tampering and take a remedial action such as preventing encryption or decryption by the die 102.

Turning next to the package 104 to which the die 102 is secured, the package 104 includes a package-level interconnect structure 150 that includes one or more dielectric layers 152 and a network of interconnecting conductors 154. The dielectric layers 152 provide physical support as well as isolation and may include dielectric materials selected to be rigid, to be impervious to air and moisture, and to provide good crack resistance. Each dielectric layer 152 may include a different material based on its location and purpose, and exterior dielectric layers 152 may include solder resist materials to control solder flow when coupling the package 104. Intermediate dielectric layers 152 may include resin laminates.

At the exterior of the package 104, the package-level interconnect structure 150 may include package interconnect connectors 156, such as ball grid array connectors, land grid array connectors, pin grid array connectors, and/or surface-mount leads. A first subset of the interconnect connectors 156 couple to a socket, while a second subset of the interconnect connectors 156 couple to bond pads of the die 102. In this way, the package-level interconnect structure 150 carries signals and power between the socket and the integrated circuit elements of the die 102.

The bond pads of the die 102 may be electrically coupled to the package 104 during a die attach process by a suitable technique, such as soldering, thermosonic bonding, ultrasonic bonding, epoxy die attach, and/or other suitable techniques. Many of these techniques also provide a degree of physical coupling as the material that electrically couples the bond pads (e.g., solder, underfill material) also physically couples the top or face of the die 102 to the package 104. To further secure the die 102 and to prevent intrusion by air and/or moisture, a mold compound may also be applied to the top, sides, and/or bottom of the integrated circuit die 102. A mold compound may include an epoxy resin with one or more fillers, catalysts, flame retardants, adhesion promotors, and/or other additives and may be configured to create a hermetic seal around the die 102. Suitable mold compounds include Epoxy Cresol Novolac (ECN) resins and other types of resins.

The integrated circuit die 102 may be physically coupled to the package 104 in any suitable configuration. For example, the integrated circuit die 102 may be coupled in a flip chip arrangement opposite the subset of package interconnect connecters 156 that couple to the socket. In other examples, the integrated circuit die 102 is coupled in an undermount arrangement where the integrated circuit die 102 is on the same side of the package as the subset of package interconnect connectors 156 that couple to the socket or an embedded arrangement where the integrated circuit die 102 is disposed between dielectric layers 152 of the package 104.

Figure 2:
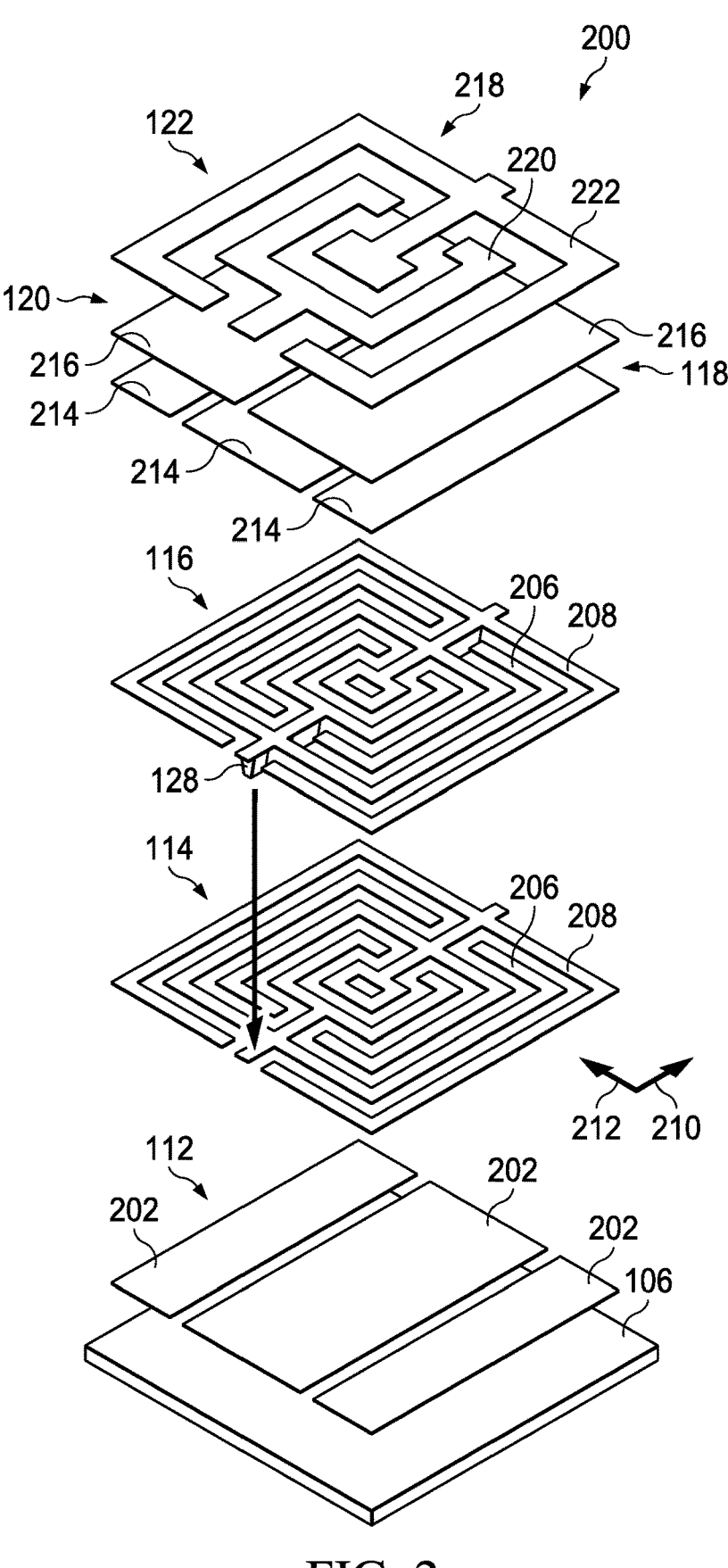
FIG. 2 is an exploded view of a portion of an integrated circuit die according to some aspects of the present disclosure.

Some suitable configurations for the tamper-sensing capacitors of the integrated circuit device are described with reference to FIG. 2, which is an exploded view of a portion of an integrated circuit die 200 according to some aspects of the present disclosure.

In many aspects, the integrated circuit die 200 is substantially similar to die 102, and die 200 includes a substrate 106 and conductor layers 112-136, which may be substantially similar to those described above. For clarity, the substrate 106 and conductor layers 112-136 have been exploded in the vertical direction, and the ILD layers 110 in which the conductive features are disposed are omitted.

In the M1 layer 112, the die 200 may include conductive features that make up a first set of shields 202. The shields 202 may include a single monolithic conductive feature extending under the entirety of the capacitors or a set of conductive features separated by regions of dielectric material. The shields 202 may be electrically coupled to ground or to a voltage source.

In the M2 and M3 layers 114 and 116, the die 200 includes a capacitor that is analogous to the second capacitor 140 of FIG. 1. For consistency, this capacitor of die 200 is identified as a second capacitor 204. The second capacitor 204 provides a reference capacitance for another tamper-sensing capacitor of the die 200. The second capacitor 204 may include features on any number of layers and, in the illustrated examples, includes a first set of M2 and M3 conductive features that form a first capacitive plate 206 and a second set of M2 and M3 conductive features that form a second capacitive plate 208. The M2 features that form the first capacitive plate 206 may be coupled to the M3 features that form the first capacitive plate 206 by vias in the V2 layer 128, and the M2 features that form the second capacitive plate 208 may be coupled to the M3 features that form the second capacitive plate 208 by other vias in the V2 layer 128.

The features that make up the second capacitor 204 may have any suitable configuration, and the illustrated examples represent a box-in-box configuration. The first capacitive plate 206 of the box-in-box capacitor includes a center portion extending in the M2 layer 114 in a first direction 210 and a plurality of side portions that extend in the M2 layer 114 in the first direction 210 parallel to and on opposite sides of the center portion. The side portions are coupled to the center portion by portions extending in a second direction 212 perpendicular to the first direction 210. The second capacitive plate 208 includes a center portion extending in the M2 layer 114 in the first direction 210 and a plurality of side portions extending in the M2 layer 114 in the first direction 210 parallel to and on opposite sides of the center portion. The side portions of the second capacitive plate 208 are coupled to the center portion by portions extending in the second direction 212. In particular, the center and side portions of the second plate 208 are configured to extend between and to surround the center and side portions of the first plate 206. The first and second capacitive plates 206 and 208 may have similar shapes and configurations in the M3 layer 116.

In further examples, the first and second capacitive plates 206 and 208 may have different shapes in the M2 layer 114 and M3 layer 116 while still containing the electric field of the second capacitor 204 between shields 202, 214, and 216 and within the outermost plate (e.g., capacitive plate 208). To further limit the electric field, additional conductive features within the M2 layer 114, M3 layer 116, and V2 layer 128 may be disposed alongside the first and second capacitive plates 206 and 208 to make the second capacitor 204 insensitive to its surroundings.

In these arrangements and others, the bulk of the electric field of the second capacitor 204 extends horizontally within the layers and vertically between the M2 layer 114 and M3 layer 116. Vertically, the electric field is shielded by the first set of shields 202 in the M1 layer 112 and other shields described subsequently. Of course, this is merely one example configuration for the second capacitor 204, and other configurations are both contemplated and provided for.

The die 200 may include any number of layers of shield material disposed on the second capacitor 204. In the illustrated example, the die 200 includes conductive features that form a second set of shields 214 and a third set of shields 216 in the M4 layer 118 and the M5 layer 120, respectively. The shields 214 and 216 may include a single monolithic conductive feature extending under the entirety of the capacitors or a set of conductive features separated by regions of dielectric material. In examples where the shields 214 and 216 include regions of dielectric material between the conductive features, the regions of dielectric material may be offset horizontally to avoid a direct path through dielectric material between the second capacitor 204 and the first capacitor, described below. The shields 214 and 216 may be electrically coupled to ground or to a voltage source.

At or near the topmost metal layer, the die 200 includes a capacitor, analogous to the first capacitor 138 of FIG. 1. For consistency, this capacitor is identified as a first capacitor 218. The first capacitor 218 is configured to have a capacitance that varies based on a package to which the die 200 is coupled to detect whether the package has been tampered with. In some examples, this is achieved by forming the first capacitor 218 on the topmost layer or layers of the die 200 such that no conductive shield is formed between the first capacitor 218 and the package. In some examples where the first capacitor 218 is not formed on the topmost layer, intervening conductive layers are configured to be free of conductive features directly between the first capacitor 218 and the package. In this way, there is little or no conductive shielding between the first capacitor 218 and the package.

The first capacitor 218 may include features on any number of layers. In the illustrated examples, the first capacitor 218 includes a first set of M6 conductive features that form a first capacitive plate 220 and a second set of M6 conductive features that form a second capacitive plate 222. The features that make up the first capacitor 218 may have any suitable configuration, and the illustrated examples represent a box-in-box configuration. The first capacitive plate 220 of the box-in-box capacitor includes a center portion extending in the M6 layer 122 in the first direction 210 and a plurality of side portions extending in the M6 layer 122 in the first direction 210 on opposite sides of the center portion. The side portions are coupled to the center portion by portions extending in the second direction 212. The second capacitive plate 222 includes a center portion extending in the M6 layer 122 in the first direction 210 and a plurality of side portions extending in the M6 layer 122 in the first direction 210 on opposite sides of the center portion. The side portions of the second capacitive plate 222 are coupled to the center portion by portions extending in the second direction 212. In particular, the center and side portions of the second plate 222 are configured to extend between and to surround the center and side portions of the first plate 220.

In this arrangement, the electric field of the first capacitor 218 extends horizontally within the M6 layer 122. Vertically below the first capacitor 218, the electric field is shielded by the second and/or third set of shields 214 and 216. However, vertically above the first capacitor 218, the shape and strength of the electric field is dictated in part by the dielectric and/or conductive features of the package coupled immediately above the first capacitor 218. Because any change in the package's dielectric or conductive features may produce a change in capacitance of the first capacitor 218, this provides a mechanism for detecting when the package is tampered with. Of course, this is merely one example configuration for the first capacitor 218, and other configurations are both contemplated and provided for.

The interconnect can be placed in various different ways or shapes. In many examples, the first capacitor 218 is implemented using one metal layer (or NWell in case of substrate) for high efficiency. This capacitor 218 is surrounded by the outer plate layer (e.g., second plate 222), which may be considered the bottom plate in a typical fringe capacitor structure. In this capacitor 218, the electric field may be contained by the outer plates of plate 222, the second and third sets of shields 214 and 216, and the package on the top. As the separation between the interconnects may be very small (e.g., less than microns), this electric field may not spread very far into the package. In many examples, it extends substantially the same depth as the separation of the interconnects at this stage. This may be very small relative to the height of the package, and hence, this ensures that this capacitance is insensitive to the environment outside the package.

Figure 3:
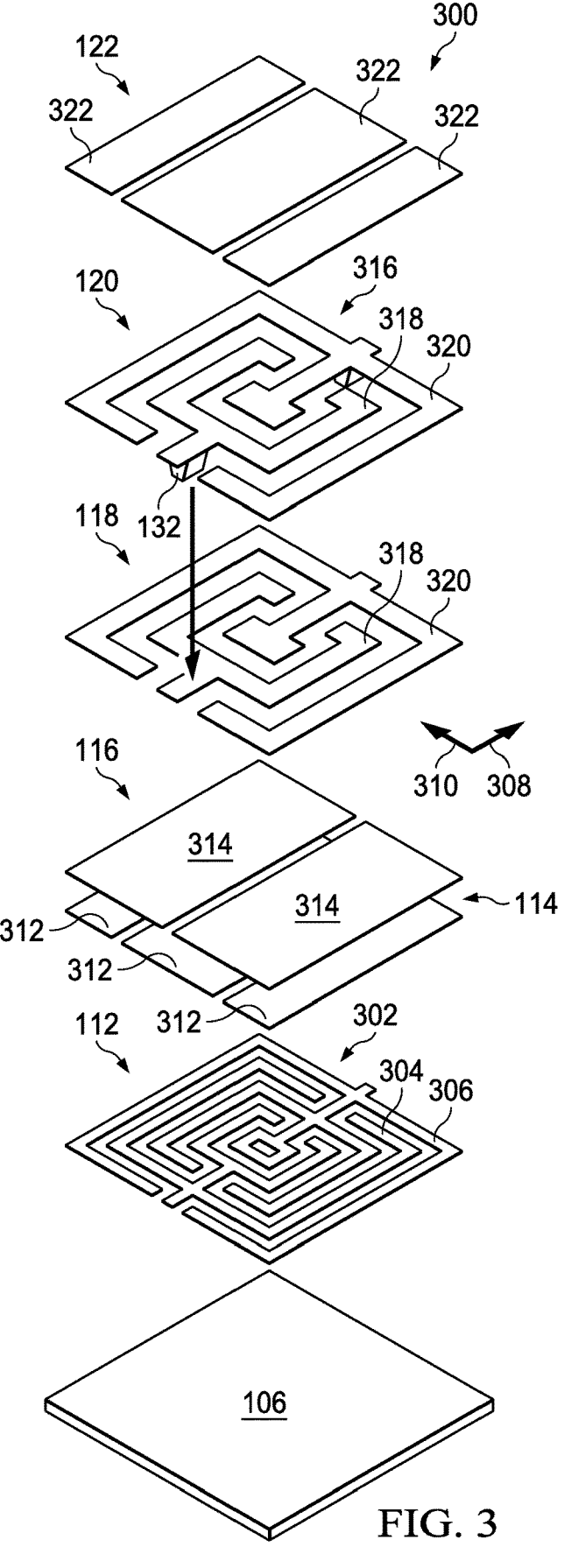
FIG. 3 is an exploded view of a portion of an integrated circuit die according to some aspects of the present disclosure.

The preceding configurations may be used to detect tampering with a package located above a die. Other suitable configurations for tamper-sensing capacitors are described with reference to FIG. 3 that may be used to detect tampering from below the die such as grinding, drilling, or otherwise tampering with the substrate. A single die may include multiple sets of tamper-sensing capacitors of each type to guard against both types of intrusion. FIG. 3 is an exploded view of a portion of an integrated circuit die 300 according to some aspects of the present disclosure.

In many aspects, the integrated circuit die 300 is substantially similar to dies 102 and/or 200, and die 300 includes a substrate 106 and conductor layers 112-136, which may be substantially similar to those described above. For clarity, the substrate 106 and conductor layers 112-136 have been exploded in the vertical direction, and the ILD layers 110 in which the conductive features are disposed are omitted.

In the M1 layer 112, the die 300 includes a first capacitor 302 that is configured to have a capacitance that varies based on a substrate 106 of the die 300 to detect whether the substrate 106 has been tampered with. In some examples, the first capacitor 302 is formed on the bottommost layer or layers of the die 300 such that no conductive shield is formed between the first capacitor 302 and the substrate 106. In some examples where the first capacitor 302 is not formed on the bottommost layer, intervening conductive layers are configured to be free of conductive features directly between the first capacitor 302 and the substrate 106. In this way, there is little or no conductive shielding between the first capacitor 302 and the substrate 106.

The first capacitor 302 may include features on any number of layers. In the illustrated examples, the first capacitor 302 includes a first set of M1 conductive features that form a first capacitive plate 304 and a second set of M1 conductive features that form a second capacitive plate 306. The features that make up the first capacitor 302 may have any suitable configuration, and the illustrated examples represent a box-in-box configuration in which the first capacitive plate 304 of the box-in-box capacitor includes a center portion and a plurality of side portions extending in the M1 layer 112 in a first direction 308. The side portions are coupled to the center portion by portions extending in a second direction 310 perpendicular to the first direction 308. The second capacitive plate 306 includes a center portion and a plurality of side portions extending in the M1 layer 112 in the first direction 308. The side portions of the second capacitive plate 306 are coupled to the center portion by portions extending in the second direction 310, and the center and side portions of the second plate 306 are arranged to extend between and to surround the center and side portions of the first plate 304.

In this arrangement, the electric field of the first capacitor 302 extends horizontally within the M1 layer 112. Vertically above the first capacitor 302, the electric field is shielded by sets of shields 312 and 314, described below. Vertically below the first capacitor 302, the shape and strength of the electric field is dictated in part by the structure, shape, and materials (e.g., semiconductor materials, dopants, dielectric materials) present in the substrate 106 underlying the first capacitor 302. Because any change in the substrate 106 may produce a change in capacitance of the first capacitor 302, this provides a mechanism for detecting when the substrate 106 is tampered with. Of course, this is merely one example configuration for the first capacitor 302, and other configurations are both contemplated and provided for.

The die 300 may include any number of layers of shield material disposed on the first capacitor 302. In the illustrated example, the die 300 includes conductive features of a first set of shields 312 and a second set of shields 314 in the M2 layer 114 and the M3 layer 116, respectively. The shields 312 and 314 may include a single monolithic conductive feature extending under the entirety of the capacitors or a set of conductive features separated by regions of dielectric material. In examples where the shields 312 and 314 include regions of dielectric material between the conductive features, the regions of dielectric material may be offset horizontally to avoid a direct path through dielectric material between a second capacitor 316 and the first capacitor 302. The shields 312 and 314 may be electrically coupled to ground or to a voltage source.

The die 300 may include a second capacitor 316, similar to that of FIG. 1, disposed on the shields 312 and 314 that provides a reference capacitance for the first capacitor 302. The second capacitor 316 may include features on any number of layers, and in the illustrated examples, the second capacitor 316 includes a first set of M4 layer 118 and M5 layer 120 conductive features that form a first capacitive plate 318 and a second set of M4 layer 118 and M5 layer 120 conductive features that form a second capacitive plate 320. The M4 features that form the first capacitive plate 318 may be coupled to the M5 features that form the first capacitive plate 318 by vias in the V4 layer 132, and the M4 features that form the second capacitive plate 320 may be coupled to the M5 features that form the second capacitive plate 320 by other vias in the V4 layer 132.

The features that make up the second capacitor 316 may have any suitable configuration, and the illustrated examples represent a box-in-box configuration, in which the first capacitive plate 318 of the box-in-box capacitor includes a center portion and a plurality of side portions extending in the M4 layer 118 in the first direction 308. The side portions are coupled to the center portion by portions extending in a second direction 310 perpendicular to the first direction 308. The second capacitive plate 320 includes a center portion and side portions extending in the M4 layer 118 in the first direction 308. The side portions of the second capacitive plate 320 are coupled to the center portion by portions extending in the second direction 310. In particular, the center and side portions of the second plate 320 are arranged to extend between and to surround the center and side portions of the first plate 318. The first and second capacitive plates 318 and 320 may have similar shapes and configurations in the M5 layer 120.

In further examples, the first and second capacitive plates 318 and 320 may have different shapes in the M4 layer 118 and M5 layer 120 while still containing the electric field of the second capacitor 316 between shields 312, 314, and 322 and within the outermost plate (e.g., capacitive plate 320). To further limit the electric field, additional conductive features within the M4 layer 118, M5 layer 120, and V4 layer 132 may be disposed alongside the first and second capacitive plates 318 and 320 to make the second capacitor 316 insensitive to its surroundings.

In these arrangements and others, the bulk of the electric field of the second capacitor 316 extends horizontally within the layers and vertically between the M4 layer 118 and M5 layer 120. The electric field is shielded by the first and second sets of shields 312 and 314 on the bottom and a third set of shields 322, described below, on the top. Of course, this is merely one example configuration for the second capacitor 316, and other configurations are both contemplated and provided for.

As noted above, the die 300 may include a set of conductive features in the M6 layer 122 that form a third set of shields 322 disposed on the second capacitor. The shields 322 may include a single monolithic conductive feature extending over the entirety of the capacitors or a set of conductive features separated by regions of dielectric material. The shields 322 may be electrically coupled to ground or to a voltage source.

Figure 4:
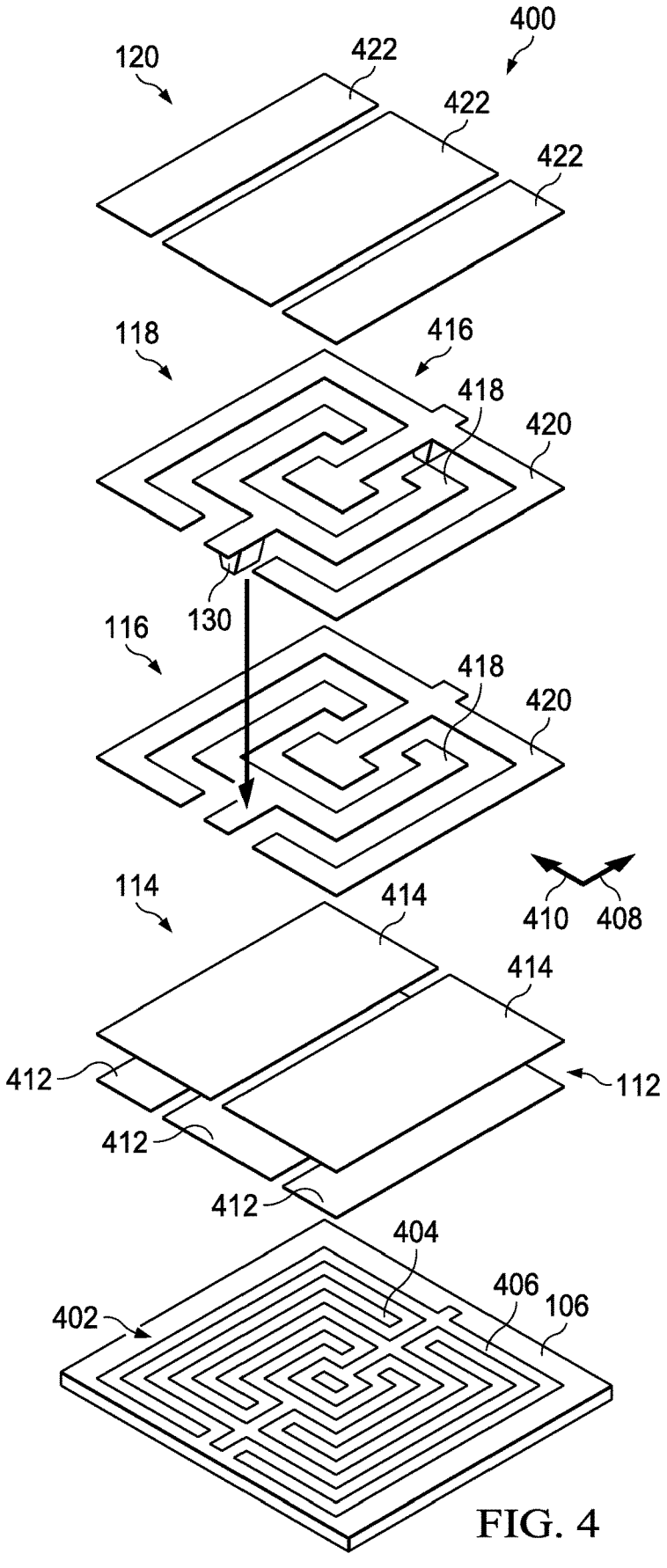
FIG. 4 is an exploded view of a portion of an integrated circuit die according to some aspects of the present disclosure.

Further configurations to detect tampering with the bottom of the die use a bottommost capacitor formed by doped regions of the substrate 106. FIG. 4 is an exploded view of a portion of an integrated circuit die 400 according to some aspects of the present disclosure.

In many aspects, the integrated circuit die 400 is substantially similar to dies 102, 200, and/or 300, and die 400 includes a substrate 106 and conductor layers 112-136, which may be substantially similar to those described above. For clarity, the substrate 106 and conductor layers 112-136 have been exploded in the vertical direction, and the ILD layers 110 in which the conductive features are disposed are omitted.

The die 400 includes a first capacitor 402 formed of doped regions (doped region 404 and doped region 406) of the substrate 106 that define capacitive plates. Doped regions 404 and 406 may be doped with n-type or p-type dopants and are disposed in a region of the substrate 106 that contains either an intrinsic semiconductor material or a semiconductor material doped to have an opposite type conductivity than regions 404 and 406 (e.g., n-type doped regions 404 and 406 disposed in and surround by a p-type region of semiconductor material or vice versa). In this way, the doped regions 404 and 406 form a first capacitor 402 that has a capacitance that varies based on the thickness of the substrate 106 to detect whether the substrate 106 has been tampered with.

The doped regions 404 and 406 that make up the first capacitor 402 may have any suitable configuration, and the illustrated examples represent a box-in-box configuration in which the first capacitive plate (e.g., region 404) of the box-in-box capacitor includes a center portion and a plurality of side portions extending in the substrate 106 in a first direction 408. The side portions are coupled to the center portion by portions extending in a second direction 410 perpendicular to the first direction 408. The second capacitive plate (e.g., region 406) includes a center portion and a plurality of side portions extending in the substrate 106 in the first direction 408. The side portions of the second capacitive plate are coupled to the center portion by portions extending in the second direction 410, and the center and side portions of the second plate are arranged to extend between and to surround the center and side portions of the first plate.

In this arrangement, the electric field of the first capacitor 402 is shielded above by sets of shields 412 and 414, while below the first capacitor 402, the shape and strength of the electric field is dictated in part by the structure, shape, and materials of the remainder of the substrate 106 extending as far as the backside of substrate 106. Because any change in the substrate 106 may produce a change in capacitance of the first capacitor 402, this provides a mechanism for detecting when the substrate 106 is tampered with. Of course, this is merely one example configuration for the first capacitor 402, and other configurations are both contemplated and provided for.

The die 400 may include any number of layers of shield material disposed on the first capacitor 402. In the illustrated example, the die 400 includes conductive features of a first set of shields 412 and a second set of shields 414 in the M1 layer 112 and the M2 layer 114, respectively. The shields 412 and 414 may include a single monolithic conductive feature extending under the entirety of the capacitors or a set of conductive features separated by regions of dielectric material. In examples where the shields 412 and 414 include regions of dielectric material between the conductive features, the regions of dielectric material may be offset horizontally to avoid a direct path through dielectric material between a second capacitor 416 and the first capacitor 402.

The shields 412 and 414 may be electrically coupled to ground or to a voltage source.

The die 400 may include a second capacitor 416, similar to that of FIG. 1, disposed on the shields 412 and 414 that provides a reference capacitance for the first capacitor 402. The second capacitor 416 may include features on any number of layers, and in the illustrated examples, the second capacitor 416 includes a first set of M3 layer 116 and M4 layer 118 conductive features that form a first capacitive plate 418 and a second set of M3 layer 116 and M4 layer 118 conductive features that form a second capacitive plate 420. The M3 features that form the first capacitive plate 418 may be coupled to the M4 features that form the first capacitive plate 418 by vias in the V3 layer 130, and the M3 features that form the second capacitive plate 420 may be coupled to the M4 features that form the second capacitive plate 420 by other vias in the V3 layer 130.

The features that make up the second capacitor 416 may have any suitable configuration, and the illustrated examples represent a box-in-box configuration, in which the first capacitive plate 418 of the box-in-box capacitor includes a center portion and a plurality of side portions extending in the M3 layer 116 in the first direction 408. The side portions are coupled to the center portion by portions extending in a second direction 410 perpendicular to the first direction 408. The second capacitive plate 420 includes a center portion and side portions extending in the M3 layer 116 in the first direction 408. The side portions of the second capacitive plate 420 are coupled to the center portion by portions extending in the second direction 410. In particular, the center and side portions of the second plate 420 are arranged to extend between and to surround the center and side portions of the first plate 418. The first and second capacitive plates 418 and 420 may have similar shapes and configurations in the M4 layer 118.

In further examples, the first and second capacitive plates 418 and 420 may have different shapes in the M3 layer 116 and M4 layer 118 while still containing the electric field of the second capacitor 416 between shields 412, 414, and 422 and within the outermost plate (e.g., capacitive plate 420). To further limit the electric field, additional conductive features within the M3 layer 116, M4 layer 118, and V3 layer 130 may be disposed alongside the first and second capacitive plates 418 and 420 to make the second capacitor 416 insensitive to its surroundings.

In these arrangements and others, the bulk of the electric field of the second capacitor 416 extends horizontally within the layers and vertically between the M3 layer 116 and M4 layer 118. The electric field is shielded by the first and second sets of shields 412 and 414 on the bottom and a third set of shields 422, described below, on the top. Of course, this is merely one example configuration for the second capacitor 416, and other configurations are both contemplated and provided for.

As noted above, the die 400 may include a set of conductive features in the M5 layer 120 that form a third set of shields 422 disposed on the second capacitor. The shields 422 may include a single monolithic conductive feature extending over the entirety of the capacitors or a set of conductive features separated by regions of dielectric material. The shields 422 may be electrically coupled to ground or to a voltage source.

Figure 5:
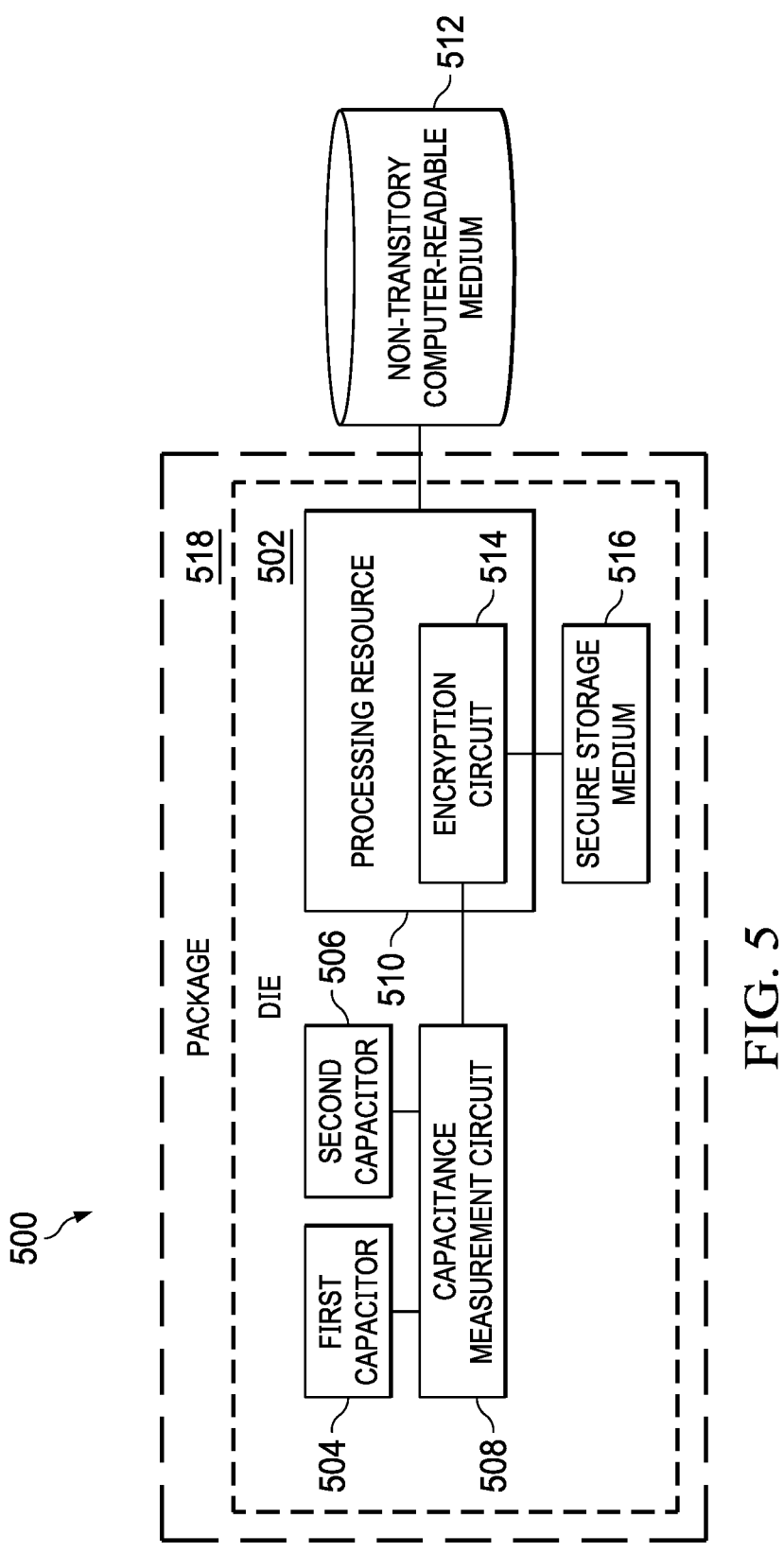
FIG. 5 is a block diagram of a computing system that includes tamper-detection capacitors according to aspects of the present disclosure.
Figure 6:
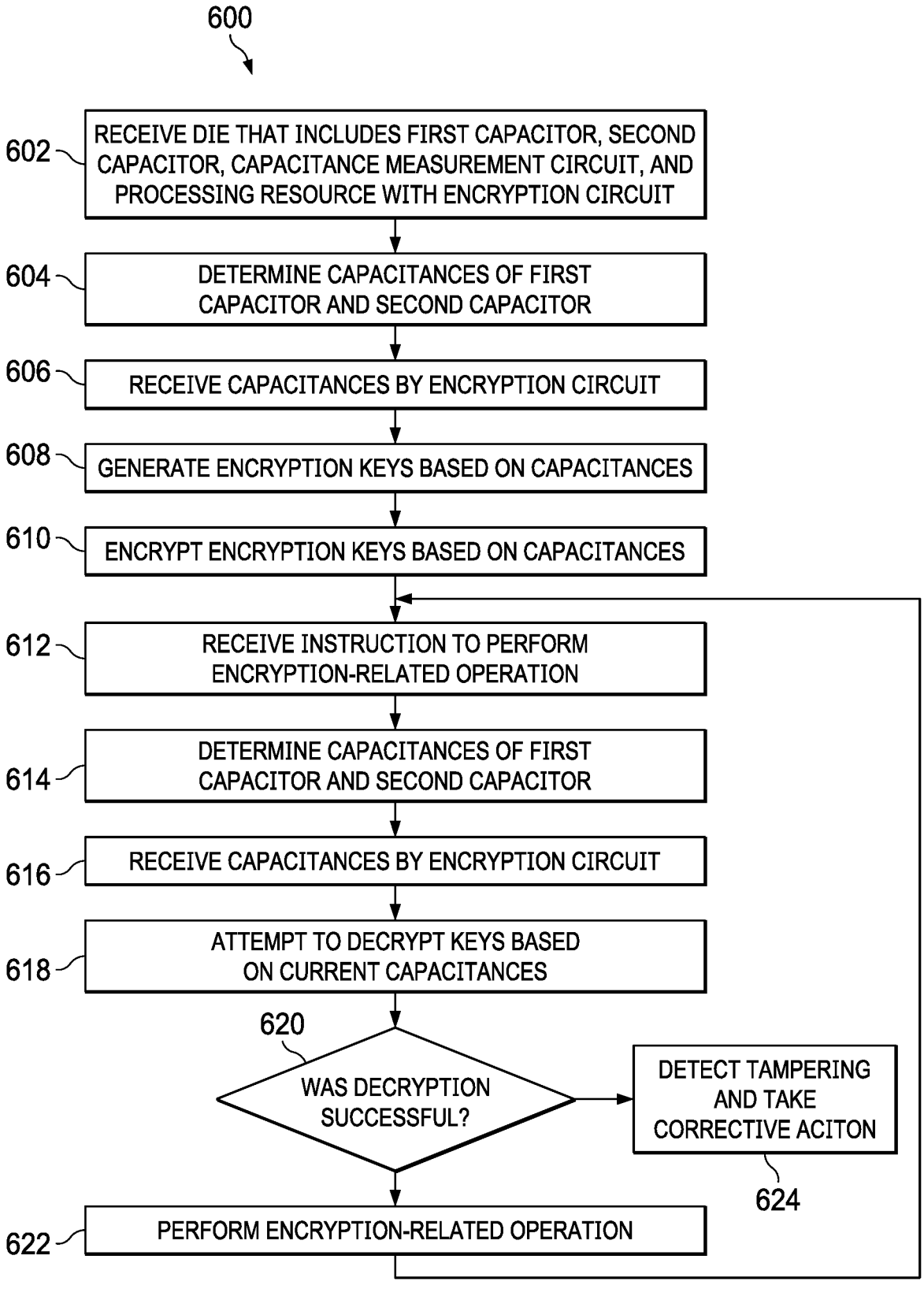
FIG. 6 is a flow diagram of a method of using a computing system to detect tampering according to aspects of the present disclosure.

A system and technique for utilizing the capacitors for tamper detection are described with reference to FIGS. 5 and 6. FIG. 5 is a block diagram of a computing system 500 that includes tamper-detection capacitors according to aspects of the present disclosure. FIG. 6 is a flow diagram of a method 600 of using the computing system 500 to detect tampering according to aspects of the present disclosure. Some processes of the method 600 may be performed in orders other than described, and many processes may be performed concurrently in parallel. Furthermore, processes of the method 600 may be omitted or substituted in some examples of the present disclosure.

Referring first to the system 500 of FIG. 5, the computing system 500 includes a die 502 (e.g., die 102, 200, 300, and/or 400) that, in turn, includes a first capacitor 504 that has a capacitance that varies in response to tampering with the die 502 and/or package, a package 518 coupled to the die 502, or another component of the computing system 500. In this regard, the first capacitor 504 may be substantially similar to capacitor 138, 218, 302, and/or 402, above.

The die 502 may also include a second capacitor 506 located proximate to (e.g., directly over or underneath) the first capacitor 504. The second capacitor 506 may be substantially similar to capacitor 140, 204, 316, and/or 416 above and may be shielded such that the capacitance of the second capacitor 506 is unaffected by tampering. However, the capacitance of the second capacitor 506 may be affected by temperature, voltage, and/or other environmental factors. As the second capacitor 506 is near the first capacitor 504, the capacitance of each may be affected by the environmental factors to a similar degree. Accordingly, a ratio of the capacitance of the first capacitor 504 to the capacitance of the second capacitor 506 may be relatively stable over a wide range of environmental conditions when there is no tampering, while exhibiting a large change when the system 500 is tampered with.

The die 502 also includes a capacitance measurement circuit 508 coupled to the first capacitor 504 and the second capacitor 506 to measure the capacitances thereof. The capacitance measurement circuit 508 may measure and provide the capacitances as independent values, as a capacitance ratio, or in any other suitable representation.

The die 502 also includes a processing resource 510 coupled to the capacitance measurement circuit 508. The processing resource 510 may include one or central processing units (CPUs), graphics processing units (GPUs), microcontrollers, application-specific integrated circuits (ASICs), and/or other processing resources configured to perform instructions.

To this end, the processing resource 510 is coupled to a non-transitory computer-readable medium 512 of the system 500, which stores instructions for the processing resource 510 to perform. In some examples, the non-transitory computer-readable medium 512 stores instructions for performing processes of method 600. The non-transitory computer-readable medium 512 may include one or more HDDs, SSDs, other flash memory devices, optical media, battery-backed RAM, and/or other memory devices suitable for storing the instructions for the processing resource 510.

The processing resource 510 may include an encryption circuit 514 to perform encryption, decryption, key management, and other encryption-related operations. The encryption circuit is coupled to the capacitance measurement circuit 508 and configured to perform some encryption-related operations based on the capacitances of the first capacitor 504 and the second capacitor 506 provided by the capacitance measurement circuit 508. The encryption circuit 514 may also be coupled to a secure storage medium 516 (e.g., flash memory) within the die 502 to store and retrieve secure data, such as encryption keys.

Turning next to the method 600, the computing system 500 may perform the processes of the method 600 using any combination of dedicated hardware and instructions stored in a non-transitory medium such as the non-transitory computer-readable medium 512.

Referring first to block 602 of FIG. 5, the die 502 is received that includes the first capacitor 504, the second capacitor 506, the capacitance measurement circuit 508, and the processing resource 510 with the encryption circuit 514. In some examples, the die 502 is coupled to a package 518, such as package 104, described above.

Referring to block 604, the capacitance measurement circuit 508 determines the capacitances of the first capacitor 504 and the second capacitor 506. These capacitances may represent the state of the die 502 when the die 502, package 518, and remainder of the system 500 have not been tampered with. Referring to block 606, the encryption circuit 514 receives the capacitances from the capacitance measurement circuit 508. The capacitance measurement circuit 508 may provide the capacitances to the encryption circuit 514 as independent values, as a capacitance ratio, or in any other suitable representation.

It has been determined that capacitive properties of the first and second capacitors 504 and 506 of any given die 502 may vary significantly from that of other dies 502, even if they are produced using the same wafer, mask, and fabrication facility. Accordingly, the capacitances may act as a unique identifier for the die 502. Therefore, in some examples, the encryption circuit 514 generates a set of encryption keys for the die 502 based on a property of these capacitances, such as the capacitance ratio of the first capacitor 504 to the second capacitor 506, and stores them in the secure storage medium 516, as shown in block 608. In this way, the encryption keys are unique to the die 502.

Referring to block 610, the encryption circuit 514 encrypts a set of encryption keys based on a property of the capacitances received in block 606, such as the capacitance ratio, and stores them in the secure storage medium 516. This may help ensure that the encryption keys can only be decrypted for use if the capacitance property remains unchanged. The processes of blocks 604-610 may be performed as part of a qualification process by the manufacturer or provider.

Referring to block 612, when the die 502 is put into operation by a customer, the processing resource 510 of the die 502 receives an instruction to perform an encryption-related operation such as executing encrypted instructions, decrypting encrypted data, encrypting unencrypted data, or other suitable operation. Referring to block 614, in response, the capacitance measurement circuit 508 determines the capacitances of the first capacitor 504 and the second capacitor 506. These capacitances may represent the current state of the die 502 when there is a possibility that the system 500 has been tampered with. Referring to block 616, the encryption circuit 514 receives the current capacitances from the capacitance measurement circuit 508. The capacitance measurement circuit 508 may provide the capacitances to the encryption circuit 514 as independent values, as a capacitance ratio, or in any other suitable representation.

Referring to block 618, the encryption circuit 514 attempts to retrieve the keys from the secure storage medium 516 and decrypt them utilizing the capacitance property of the first and second capacitors 504 and 506 used to encrypt them in block 610. In some examples, this includes attempting to decrypt the keys using the ratio of the capacitance of the first capacitor 504 to the capacitance of the second capacitor 506.

Referring to block 620, the encryption circuit 514 determines whether the keys were properly decrypted using the capacitance property. If so, the encryption circuit 514 uses the keys to perform the encryption-related operation as illustrated in block 622. The method 600 may return to block 612 and await further instructions.

However, it is also possible that the die 502 has been tampered with in a manner that is reflected in the capacitive property (e.g., a change in the capacitance ratio). If so, the decryption may fail. In such case, the method 600 proceeds from block 620 to block 624 where the encryption circuit 514 detects tampering based on the capacitive property and/or the failure to decrypt and takes a corrective action. In some examples, this corrective action includes deleting the keys from the secure storage medium 516 so that they may not be improperly accessed. In some examples, the corrective action includes triggering an alert at a user interface warning that encryption and decryption are not able to be performed. In further examples, other corrective actions are taken. Regardless, even if no corrective actions are taken, it may be impossible to recover the encrypted data because the keys are lost.

It is understood that the integrated circuit devices and tamper-detecting capacitors described herein may be advantageously used other applications, tangential or unrelated to encryption. In that regard, while encryption keys encoded based on a capacitance property such as a capacitance ratio is an example of the present disclosure, it is understood that application of these teachings to other applications is consistent with and contemplated by the present disclosure.

What is claimed is:

1. A system comprising:

a substrate; and a first interconnect including a plurality of metal layers, the first interconnect including:

a first set of shields in a first metal layer of the plurality of metal layers;

a first capacitor including first and second capacitor plates, the first capacitor plate including first and second portions in second and third metal layers, respectively, of the plurality of metal layers, and the second capacitor plate including third and fourth portions in the second and third metal layers, respectively, in which the second and third metal layers are adjacent metal layers in the first interconnect and the first and second portions are coupled together through a via between the second and third metal layers;

a second set of shields, including a first subset of shields in a fourth metal layer of the plurality of metal layers, and a second subset of shields in a fifth metal layer of the plurality of metal layers, in which the fourth and fifth metal layers are adjacent metal layers in the first interconnect; and a second capacitor, including first and second capacitor plates in a sixth metal layer of the plurality of metal layers;

a second interconnect coupled to the sixth metal layer;

a package coupled to the second interconnect; and a capacitance measurement circuit coupled to the first capacitor and the second capacitor and configured to determine a capacitance of the first capacitor and a capacitance of the second capacitor;

wherein a capacitance of the second capacitor is affected by tampering of the package and a capacitance of the first capacitor is unaffected by tampering of the package.

2. The system of claim 1, wherein the first interconnect includes a plurality of dielectric layers.

3. The system of claim 1, wherein the first portion of the first capacitor plate of the first capacitor and the third portion of the second capacitor plate of the first capacitor each have multiple segments arranged in the second metal layer.

4. The system of claim 3, wherein the second portion of the first capacitor plate of the first capacitor and the fourth portion of the second capacitor plate of the first capacitor each have multiple segments arranged in the third metal layer.

5. The system of claim 1, wherein the second capacitor plate of the second capacitor includes outer segments substantially surrounding the first capacitor plate of the second capacitor, the second capacitor plate of the second capacitor further including an inner portion substantially surrounded by segments of the first capacitor plate of the second capacitor.

6. The system of claim 2, wherein the first metal layer is disposed between dielectric layers of the plurality of dielectric layers.

7. The system of claim 2, wherein a dielectric layer of the plurality of dielectric layers is disposed between the second and third metal layers.

8. The system of claim 2, wherein a dielectric layer of the plurality of dielectric layers is disposed between the fifth and the sixth metal layers.

9. The system of claim 2, wherein a dielectric layer of the plurality of dielectric layers is disposed between the substrate and the first metal layer.

10. The system of claim 1, wherein the capacitance measurement circuit is configured to provide a ratio of the capacitance of the second capacitor to the capacitance of the first capacitor.

11. The system of claim 10, wherein tampering of the package is determined based on a change in the ratio.

12. The system of claim 10, further comprising an encryption control circuit coupled to the capacitance measurement circuit and configured to receive the ratio.

13. The system of claim 12, wherein the encryption control circuit is configured to detect tampering of the package based on the ratio.

14. The system of claim 12, wherein the encryption control circuit is configured to attempt to decrypt an encryption key based on the ratio.

15. The system of claim 12, wherein the encryption control circuit is configured to delete an encryption key based on the ratio.

16. The system of claim 12, further comprising a processing resource that includes or is coupled to the encryption control circuit.

17. The system of claim 1, wherein tampering of the package changes the capacitance of the second capacitor.

* * * * *